Figure 1:
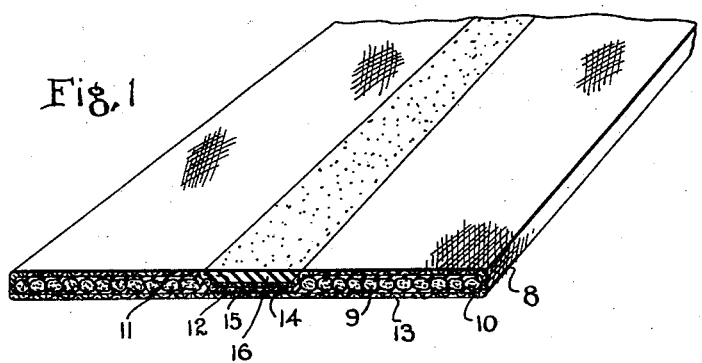

April 16, 1935. L. H. GLADWIN 1,998,011
POWER TRANSMITTING BELT
Filed Oct. 10, 1929

Inventor
Louis H. Gladwin

By
Attorney

Patented Apr. 16, 1935

1,998,011

UNITED STATES PATENT OFFICE 1,998,011

POWER TRANSMITTING BELT

Louis H. Gladwin, Akron, Ohio, assignor, by mesne assignments, to Wingfoot Corporation, Wilmington, Del., a corporation of Delaware Application October 10, 1929, Serial No. 398,641

5 Claims. (Cl. 74—232)

This invention relates to belts for transmitting power over pulleys and it has for an object the provision of a belt, the surfaces of which are free from ridges or other protuberances which ordinarily interfere with the smooth operation thereof.

Another object of the invention is to provide a belt having a fabric envelope in which the edges of the fabric are so arranged that during operation of the belt such edges will not become separated from the core of the belt.

Another object of the invention is to provide a belt which is relatively flexible intermediate its edges in order that it may be easily retained on crowned pulleys over which belts frequently operate.

The so-called rubberized cord belt comprises a core of longitudinally extending cords disposed side by side and a woven fabric envelope which encloses such cords. In some belts of this character, the edges of the woven fabric envelope overlap and extend to opposite edges of the belt and thus one surface of the latter is provided with two thicknesses of fabric covering. A belt of this character is highly satisfactory in operation but, owing to the fact that considerable fabric is employed in the envelope, its manufacture involves an expense which prevents its use in many instances.

Other belts of cord construction likewise have a core of longitudinally extending cords but the edges of the woven fabric envelope are disposed centrally of the belt. Ordinarily, such edge portions of the envelope overlap slightly and the exposed edge is covered with a thin strip of rubber. While such a belt is less expensive than that belt previously described, the exposed edge of the fabric envelope frequently becomes separated from the belt primarily because the central portion of the belt is subjected to a greater flexing action by reason of its operation over crowned pulleys. Once the exposed edge of the envelope becomes slightly separated from the belt proper, further separation of the envelope from the cord quickly occurs and the belt soon fails.

According to this invention, a belt is provided having a core of longitudinally extending cords, but centrally of the core several cords are omitted thus providing a longitudinally extending recess in the core. Preferably, also the cords on opposite sides of this recess are of different twist in order to insure retention of the belt on the pulleys about which it operates. The core thus constructed is enclosed in a woven fabric envelope, preferably rubberized. The edges of the envelope are pressed downwardly into the recess formed in the core, preferably in overlapping relation and then a rubber insert is disposed in the recess outwardly of the envelope. By means of such a construction, the edges of the envelope are not exposed to the surface and the belt has greater flexibility centrally of its edges by reason of which it is less apt to fail during operation over crowned pulleys.

According to another form of the invention only one edge portion of the envelope is pressed into the recess formed in the core of the belt while the other edge portion of the envelope is disposed substantially in alignment with the adjacent outer surface of the belt. Between the two edge portions of the fabric, rubber is inserted in order to fill the recess in the core and to retain the edges of the envelope firmly assembled therewith. Such a belt also has considerable flexibility centrally of its edges and will operate on crowned pulleys similarly to the belt constructed according to the first form of the invention described.

Figure 2:
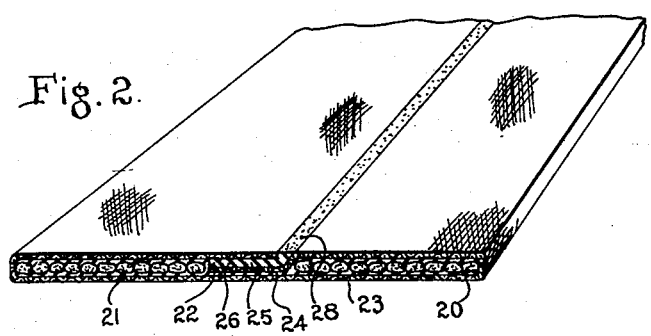

For a better understanding of the invention, reference may now be had to the accompanying drawing, in which:

Fig. 1 is a perspective view of a belt constructed according to one form of the invention and showing a cross-sectional view thereof; and Fig. 2 is a perspective view of a belt constructed according to another form of the invention and also showing a cross-sectional view thereof.

According to Fig. 1, a belt 8 is provided, having a core 9 consisting of two series of cords 10 and 11, the cords of which extend longitudinally of the belt. Between the two series of cords 10 and 11, a space or recess 12 is provided which is substantially equal to the space occupied by five of the cords. The cords of these two series 10 and 11 preferably are twisted in opposite directions in order to prevent side slipping of the belt during its operation over pulleys. The particular manner of twisting the cords and arranging them in the belt is substantially the same as that embodied in the patent to Teisher No. 1,676,845, issued July 10, 1928.

The core 9 is enclosed by a woven fabric envelope 13 which preferably is of such construction that the warp and weft threads thereof extend obliquely to the length of the belt. The edge portions of the envelope 13, as indicated at 14 and 15, are pressed downwardly into the recess 12 formed between the series of cords 10 and 11 and preferably one edge portion of the envelope overlaps the other. Then a strip of rubber 16 is disposed in the recess 12 outwardly of the edges 14 and 15 of the envelope and the assembled construction is vulcanized in a hydraulic press provided for curing flat rubber belts. When vulcanized the belt has surfaces which are free from protuberances, ridges and the like and the overlapping edges of the envelope are unexposed.

According to Fig. 2, the belt is provided with two series of cords 20 and 21 identical with the two series of cords 10 and 11 illustrated by Fig. 1, and likewise, a recess 22, similar to the recess 12, is provided between the two series of cords. A woven fabric envelope 23 preferably so constructed that the threads therein extend obliquely to the length of the belt, encloses the cords 20 and 21 and its edges are disposed in the recess 22. One edge portion 24 of the envelope 23 is pressed downwardly into this recess and thereafter a strip of rubber 25 is disposed in the recess outwardly of the edge portion therein. The other edge portion of the fabric envelope 23, indicated at 26, is disposed outwardly of the rubber 25 with its edge spaced slightly from the other edge portion of the envelope, thereby slightly exposing the rubber insert 25 to the outer surface of the belt, as indicated at 28. Then the belt is vulcanized in the manner previously referred to which results in a construction having smooth outer surfaces, and one in which the overlapping edges of the envelope are not exposed.

It is apparent that each of the constructions described and illustrated is more flexible centrally of its edges than it is adjacent such edges and therefore, that each belt will readily operate over crowned pulleys. It is apparent also that the edges of the fabric envelope are not exposed to an outer surface of the belt and thus during operation of either belt, it is unlikely that separation of the edge portions of the cover from the core will occur. Moreover, such constructions are inexpensive because less cords are employed in the core and less fabric in the envelope than are usually employed in cord belt constructions of this character. While preferably the cords in the two series of each belt are twisted in reversed directions in the manner disclosed in the patent to Teisher previously referred to, it is to be understood that the cords may be twisted in the same direction if desirable. Moreover, the woven fabric envelope need not be so arranged that its threads extend obliquely to the length of the belt although this is preferable because the envelope has a greater elongation longitudinally of the belt than it would have otherwise.

Although I have illustrated only the preferred forms of the invention and have described those forms in detail, it will be apparent to those skilled in the art that the invention is not so limited but that various modifications may be made therein without departing from the spirit of the invention or from the scope of the appended claims.

What I claim is:

1. A belt comprising a core having a recess therein, an envelope for the core, said envelope having its edges arranged in said recess, and a relatively flexible material disposed in and substantially filling the recess and covering said edges whereby the latter are out of the plane of the surface of the belt while the outer surface of the material is in the plane of the surface of the belt.

2. A belt comprising a core having a recess extending longitudinally thereof, an envelope for the core, said envelope having its edges extending longitudinally of the belt and arranged in said recess, and relatively flexible rubber disposed in and substantially filling the recess and covering said edges whereby the latter are out of the plane of the surface of the belt while the outer surface of the rubber is in the plane of the surface of the belt.

3. A belt comprising a core formed with a plurality of cords extending longitudinally of the belt, certain of the cords being spaced to provide a longitudinally extending recess, an envelope for the core having its edges disposed longitudinally of the belt and arranged in said recess, and a relatively flexible material disposed in and substantially filling the recess and covering said edges whereby the latter are out of the plane of the surface of the belt while the outer surface of the material is in the plane of the surface of the belt.

4. A belt comprising a core having a recess extending longitudinally thereof, a fabric envelope for the core, said envelope having its edges extending longitudinally of the belt and arranged in overlapping relation in the recess, and a relatively flexible material disposed in and substantially filling the recess outwardly of said edges whereby the outer surface of said material will be flush with the outer surface of said envelope.

5. A belt comprising a core embodying a series of cords extending longitudinally of the belt, certain of the intermediate cords being spaced to provide a longitudinally extending recess, a fabric envelope for the core having its edges disposed longitudinally of the belt, and arranged in overlapping relation in the recess, and relatively flexible rubber disposed in and substantially filling the recess outwardly of said edges whereby the outer surface of said rubber will be flush with the outer surface of said envelope.

LOUIS H. GLADWIN.